United States Patent [19]
Amo et al.

[11] Patent Number: 5,844,181
[45] Date of Patent: Dec. 1, 1998

[54] INFORMATION DISPLAY SYSTEM

[75] Inventors: Stephen D. Amo, Oakville; Dean L. Lacheur; Neil S. Lacheur, both of Toronto, all of Canada

[73] Assignee: Verticore Communications Ltd., Toronto, Canada

[21] Appl. No.: 834,876

[22] Filed: Apr. 10, 1997

[30]    Foreign Application Priority Data

Mar. 12, 1997 [CA]   Canada ................................. 2199757

[51] Int. Cl.⁶ ...................................................... B66B 1/34
[52] U.S. Cl. ...................... 187/396; 187/397; 187/393; 187/414; 187/247
[58] Field of Search ................................... 187/396, 397, 187/395, 414, 247, 393, 391

[56]               References Cited

U.S. PATENT DOCUMENTS

| | | | |
|---|---|---|---|
| 4,577,177 | 3/1986 | Marubashi | 340/19 R |
| 4,749,062 | 6/1988 | Tsuji et al. | 187/139 |
| 4,979,593 | 12/1990 | Watanabe et al. | 187/12 |
| 4,995,479 | 2/1991 | Fujiwara et al. | 187/135 |
| 5,042,620 | 8/1991 | Yoenda et al. | 187/391 |
| 5,056,629 | 10/1991 | Tsuji et al. | 187/139 |
| 5,485,897 | 1/1996 | Matsumoto et al. | 187/399 |
| 5,606,154 | 2/1997 | Doigan et al. | 187/396 |

FOREIGN PATENT DOCUMENTS 2241090   8/1991   United Kingdom ................... 187/395

*Primary Examiner*—Robert Nappi
*Attorney, Agent, or Firm*—Orange & Associates

[57]                ABSTRACT

A display apparatus within elevator cabs or elevator waiting areas that facilitates the simultaneous display of advertising and general news information is described. Broadcast from a remote control center, advertising and general news information updates are transmitted to, and stored in, a display memory and subsequently displayed on a screen according to a remotely modifiable program schedule. The display is updated such that it contains a copy of the latest broadcast schedule, as well as the advertisement and information programming, and automatically displays a days program according to the most current broadcast schedule. The display units are each individually addressable thus allowing groups of displays to be simultaneously updated from a remote centralized location with information such as news updates and the like.

17 Claims, 8 Drawing Sheets

INFORMATION DISPLAY SYSTEM

This invention relates to an information transmission and display system and in particular to an information display system for elevators and the like.

BACKGROUND OF THE INVENTION

In most urban centers, exposure to information such as advertising information and current news information has become an accepted part of everyday life. Apart from newspapers, magazines and television, mass advertising information is presented by way of billboards and more recently pixelboards™, which are capable of displaying relatively simple animated pictures and textual information. However as with most information it is more effective to have both a captive audience and a well-targeted group in order to maximize the effectiveness and impact of the information conveyed. Almost all-urban centers have a large number of major office complexes. It is estimated that currently more than 12 million people shop and work in these major office complexes in Canada and the United States. These office complexes include multi-storied buildings serviced by elevators and large common areas providing a heretofore-unexploited environment for presentation of advertising and news information. Display systems for these environments should amongst others have the ability to target specific audiences with the information they present, respond quickly and easily to information change, and provide a consistent high quality image and information content.

To date, information display systems for elevators are capable of presenting at most the floor number and in some cases a floor directory of tenants. For example, U.S. Pat. No. 4,995,479 to Fujiwara, describes a display apparatus for an elevator in which information regarding the operating conditions of the elevator is displayed along with "general" information, such as news and weather. A display unit is provided within the elevator cab and includes a display area for displaying text along side a picture display area for displaying predetermined graphic images. Predetermined pieces of information are assembled and assigned a number indicative of a priority for that piece of information. The information selected to be displayed according to the priorities assigned. Limitations of this system are that the messages are not easily updateable and information is restricted to textual and primitive graphic data. Furthermore, the system does not provide for an easily updateable real time information delivery and display system.

In U.S. Pat. No. 5,056,629 to Tsuji, et al., a display apparatus for an elevator is described, in which information concerning news, weather, etc., is displayed on a display screen located with the elevator cab. The information is selected to be displayed at predetermined times. The device described in this patent allows for the information displayed to be corrected (i.e. other information displayed) through inputs made remotely from the elevator cab, for example, from a caretakers room or a portable computer. Once again this patent discloses a simple scrolling message display system, which although updateable via a remote computer, requires extensive user intervention to constantly update the displayed messages. Furthermore, the display of the information is dependent to some extent on the operational parameters of the elevator.

In U.S. Pat. No. 5,485,897 to Matsumoto, et al., an elevator display system is disclosed in which the optional information of the elevator, in particular a floor indicator, is superimposed on a background image on a display screen. The background image is described as being a plurality of still pictures assigned to the different floors at which the elevator stops or different kinds of animations assigned to the different floors. Once a this patent does not disclose a method of simultaneously altering the information in a series of elevators independent of a particular elevator operational state.

Thus, based on the current state of the art regarding elevator and foyer display systems, there is a need for a system for displaying real time information content targeted to a specific audience and which provides that the information is centrally coordinated and disseminated. Furthermore, currently available systems do not provide a system that is completely site addressable with the potential for a building, including multiple elevator banks within a building, to have its own unique daily program. Furthermore, there is a need for a system that is capable of communicating on a daily basis new information relevant to tenants or users of the building and which is capable of replacing the relatively ineffective paper and poster notification methods currently in use along with the associated manpower costs.

There is also a need for a display system that is both flexible that can be installed in existing elevator banks and can provide an impact close to the point of purchase and can effectively target an extremely attractive market place and which does not necessarily require extensive government regulatory approval.

SUMMARY OF THE INVENTION

This invention seeks to provide in an information display system an information display apparatus and a method for easily updating displays in the system such that information composed at a centralized location may be easily presented at the displays.

It is an object of the present invention to provide general information display units which may be located in elevator cabs and waiting areas.

A further object of the invention is to facilitate remote control and automated information updates, simultaneously, to a number of display units located in elevator cabs and waiting areas.

A further object of the invention is to provide time sensitive information to the display units, and to provide such information independent of elevator operation.

A further object of the invention is to provide an information and advertising presentation in a relatively easily understandable manner utilizing a relatively high-resolution display and which may be easily integrated into existing elevator cabs and waiting areas.

In accordance with this invention there is provided a device for displaying information in at least one elevator cab, the device comprising:

a display screen located in each elevator cab said display adapted to receive and display information on said screen;

a building server located in the building in which each elevator cab is located, the building server being adapted to communicated information to each display screen; and a central server remotely located from the building servers, wherein the information to be displayed is transmitted from the central server to the building servers and then to the display screens.

BRIEF DESCRIPTION OF THE DRAWINGS

These and other advantages of the present invention will become more apparent from the following discussion of preferred embodiments of the invention and which are described by way of example only with reference to the accompanying drawings in which like elements have been assigned like numerals and wherein.

DETAILED DESCRIPTION OF A PREFERRED EMBODIMENT

Figure 1:
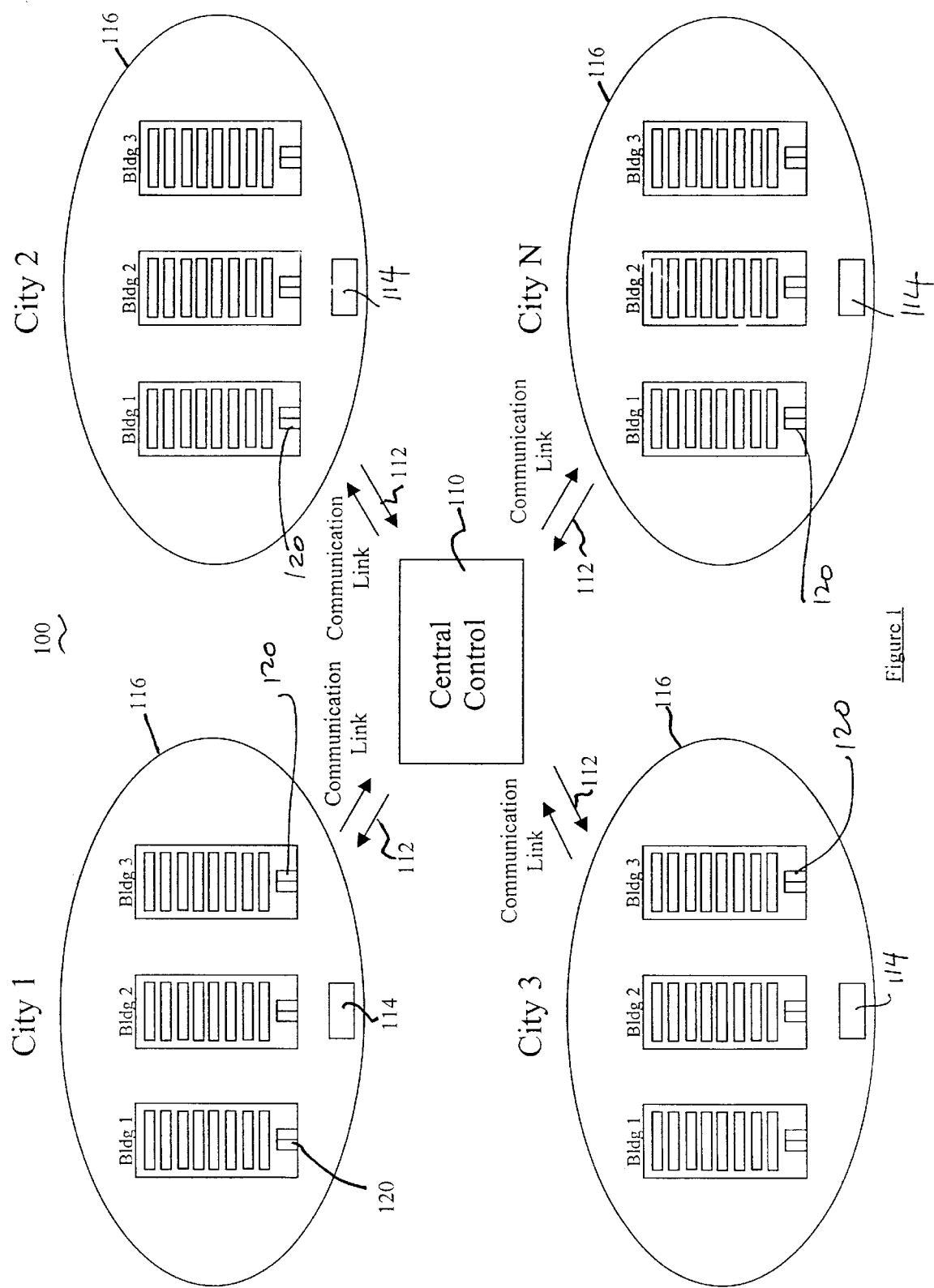
FIG. 1 is a block diagram showing a network configuration of an information system according to an embodiment of the invention.

Referring to FIG. 1, a schematic network architecture is shown generally by numeral 100. The network includes a centralized control center or system server 110 which communicates via suitable communication links 112, with city control center servers 114. Each city may include one or more servers 114, however each server 114 has associated, therewith, a number of buildings in a given city. The group of buildings serviced by the city server 114 is identified by reference numeral 116. Although a single city server 114 is shown per city group, this may include more than one city server within a given city.

The city servers 114 then communicate in turn with individual buildings within its group 116 via a communication inks, for example via a telephone line, a wireless communication, infrared or any suitable communication link. Within each building, for convenience is located a further server denoted a building server 120 which is then responsible for communicating with the individual elevator banks within the building. A display unit 210 is located within each elevator bank for displaying the information communicated hereto.

Figure 2:
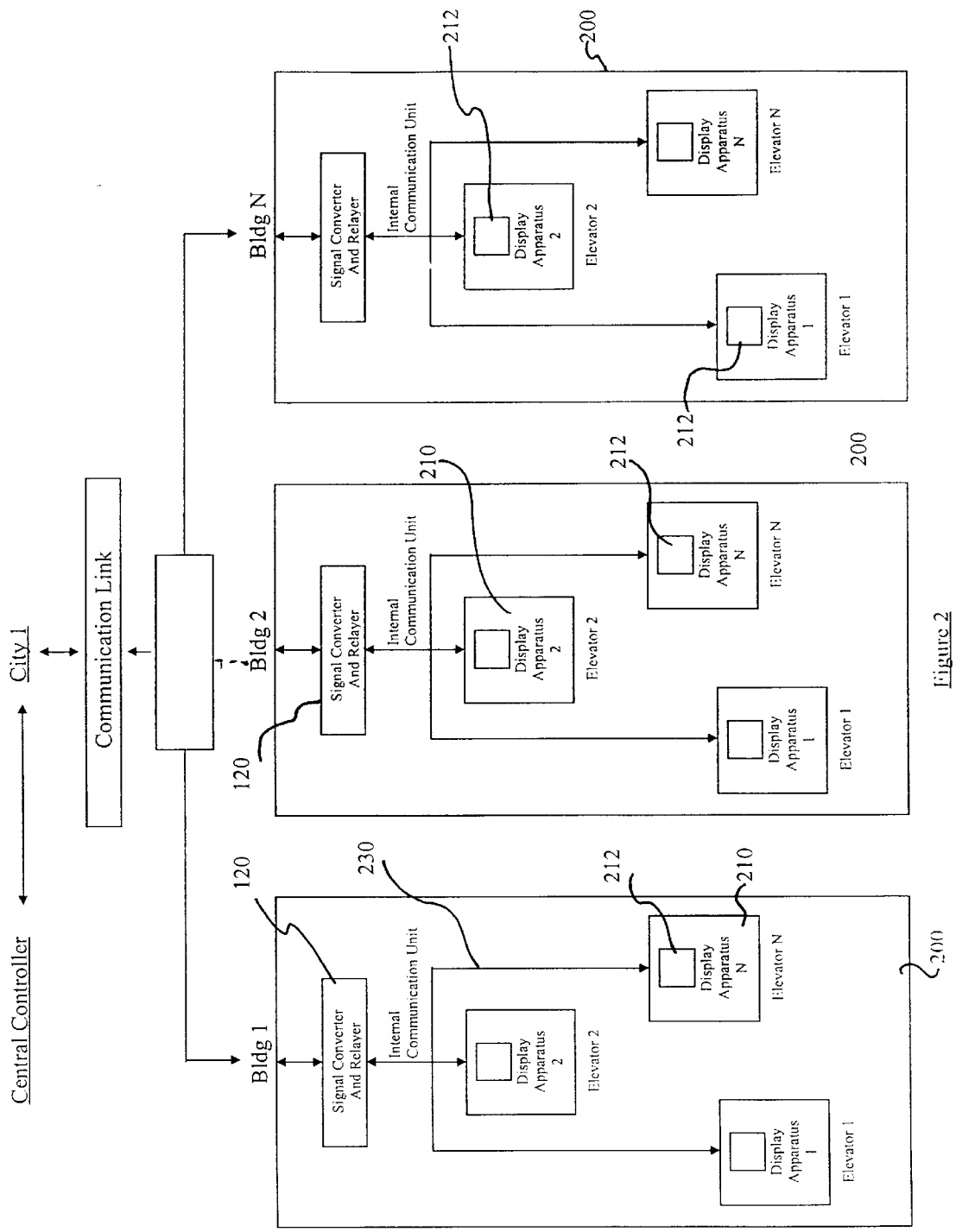
FIG. 2 shows a network configuration for a specific aspect of the general network configuration.
Figure 3:
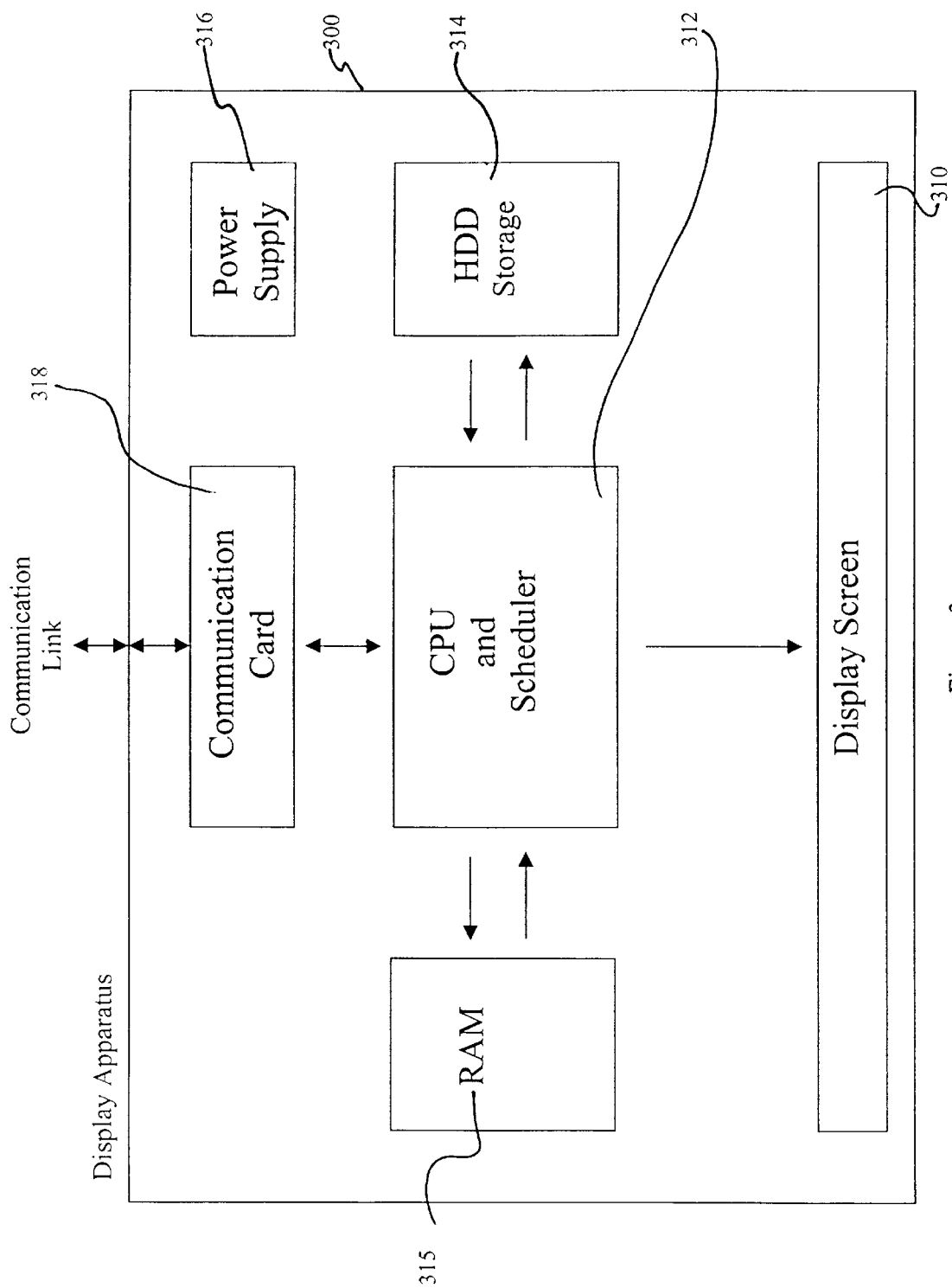
FIG. 3 is a schematic block diagram of a display unit.

The architecture of the network within a building is shown in greater detail with reference to FIG. 2. Referring to FIG. 2, an office complex includes one or more buildings 200. The buildings 200 include one or more elevator banks 210 serviced by elevator cabs. Within each elevator cab is located a display 212 which is a self contained unit including a flat screen display 310, typically a liquid crystal display similar, a microprocessor 312, a mass storage device 314, a memory (RAM) 315 and a power supply 316 as shown in FIG. 3. The building server 220 is connected to each display device 210 with in each elevator cab via a cable 230 which may be included within the bundle of cables already provided to the elevator cab. In a further embodiment, however, the display and the building may include wireless communication devices. As it is anticipated the present system will be retrofitted into existing elevators, the use of a wireless communication link between the display and the building server is desirable as the existing wiring to the elevator may be difficult to access. Furthermore, by providing a display which is separate to the existing elevator control system obviates the need to obtain authorization from elevator service companies to perform maintenance or updates on the information display system.

By providing individual servers 220 within a building allows in addition to the common information received by all other buildings, the ability to add additional individualized information pertaining to a specific building. For example, a building landlord might include with the regular programming information, information on interruptions due to maintenance, emergency procedures, vacancies, etc. Also, with the proliferation of shops within building complexes, advertising information for these businesses may also be easily included with the building specific information. However, it may be seen that because the buildings are serviced by centralized city server 120, the bulk of the information displayed is synchronized with each building and the building specific information will not interrupt the information transmitted to other buildings within the network, while still maintaining centralized control and delivery of generalized information to the other elevator display units within the city.

In FIG. 3, a detailed block diagram of the display device is shown generally by numeral 300. The display device includes an electronic communication card 318 such as an Ethernet card or other suitable network protocol card. The display also includes a computer 312, memory 315, mass storage device 314 (such as a hard disk drive) and a suitable power supply 316. A display screen 310 is also provided for displaying relevant information, most typically this is a color liquid crystal display as used for example in laptops. The display unit components are encased in a suitable housing (not shown) which may be customized to be esthetically integrated with the elevator cab interior.

Figure 4:
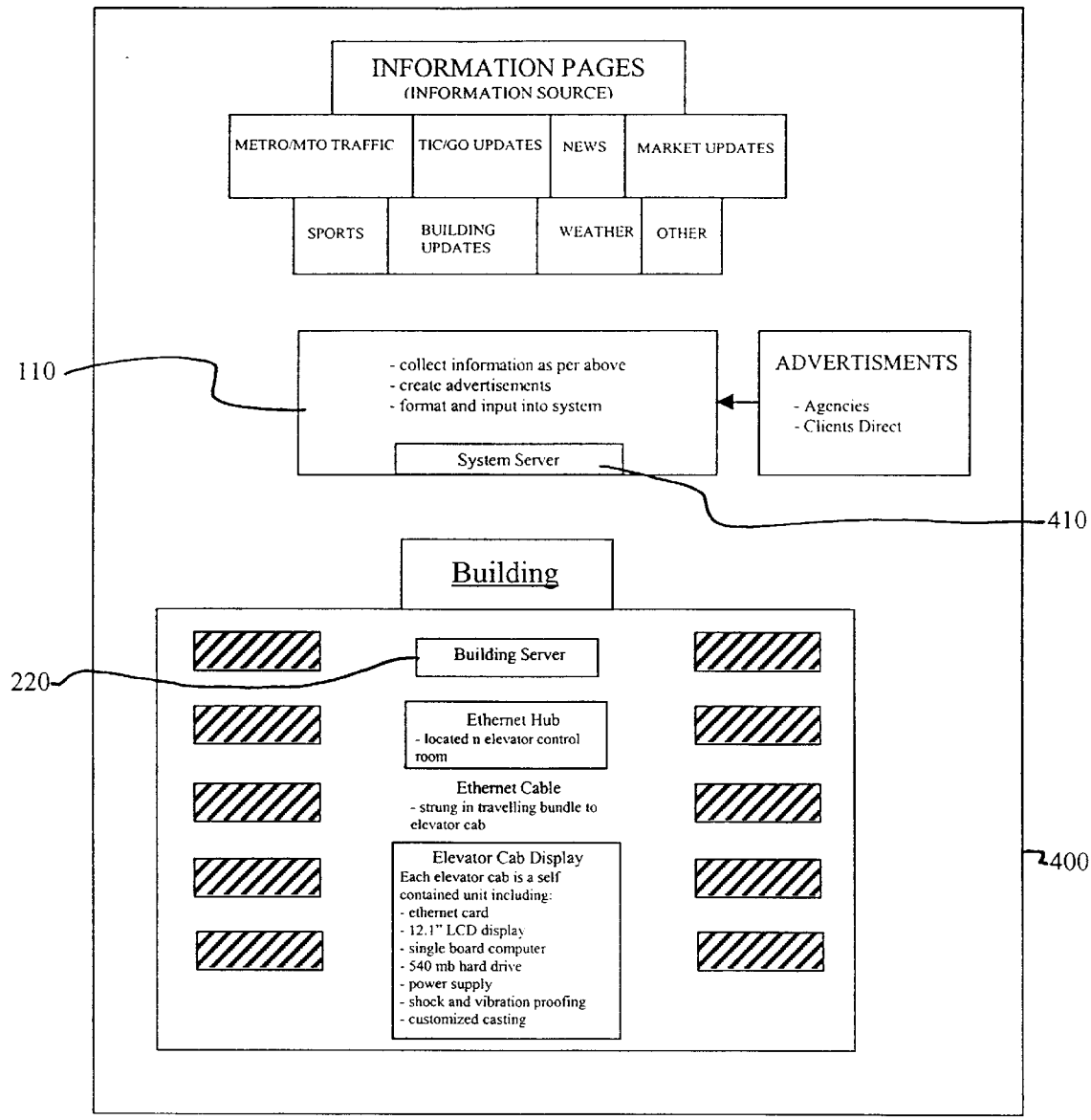
FIG. 4 is a schematic diagram of the information flow from a central control to a display.

Referring to FIG. 4, the flow of information from the centralized control center 110 to the individual displays within the elevator cabs is shown generally by numeral 400. The control center referred to previously in FIG. 4 includes a system server computer 410 which gathers information pages for transmission to the various displays. These information pages may include amongst other, traffic reports, subway or train schedule updates, news clippings such as business and financial news, stock market updates, sports, weather and any other information of relevance to all or specific cities. In addition, the information may include building updates which is information specific to a specific building or groups of buildings within a city or across cities.

For example, in North America, it is not unusual of for a single real estate company to own various office complexes in different cities. Should it be desired that building information is to be provided to all their buildings this information may be complied at the system server site and appended to the existing general information. Because all building servers are individually addressable from the system server, the specific information destined for the requisite buildings may be communication to their respective displays without effecting the information display to other buildings. Once delivered to the building server, the information is relay to the appropriate displays via the internal communication links of the building which as mentioned earlier may include wired, wireless or infrared links. In this manner, a display unit in any location can be reached from a central control point and information provided thereto in a consistent and timely manner. Furthermore, since the displays are individually addressable, advertising, information and scheduling updates are addressed to specific displays only when and where appropriate.

Once the relevant information has been communicated to the appropriate display apparatus in the elevator cabs, the information is processed by the computer within the display apparatus and then forwarded to the display screen. The display screen may be divided into two general areas, namely an information display area and an advertisement display area. Thus, both types of information may be simultaneously displayed. A different number of display areas within a given screen may also be implemented. However, this may be too distracting and thus less effective.

Figure 5:
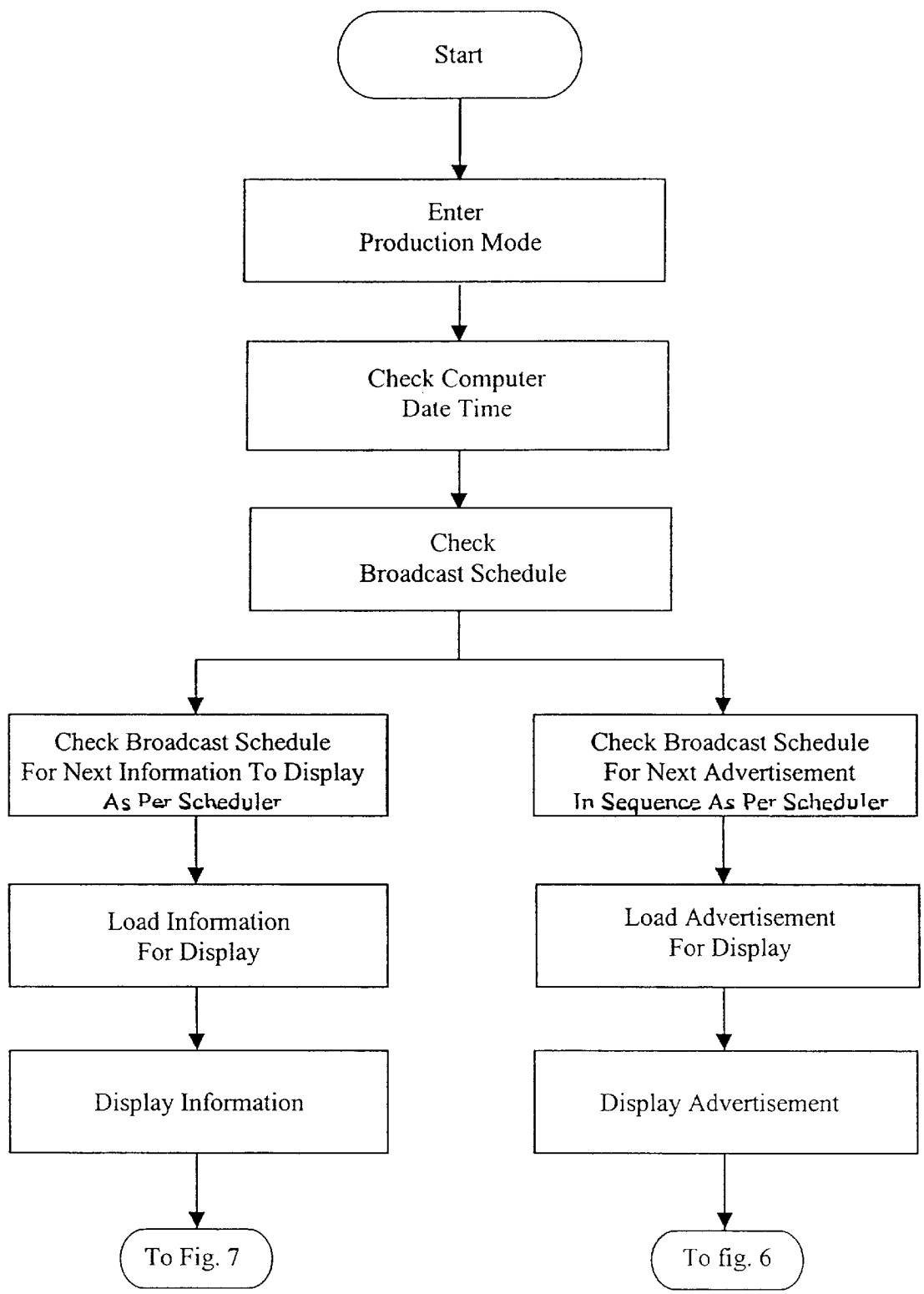
FIG. 5 is a flow chart showing the operation including updated and control of the display.
Figure 6:
FIG. 6 shows a front view of an information display screen.
Figure 7:
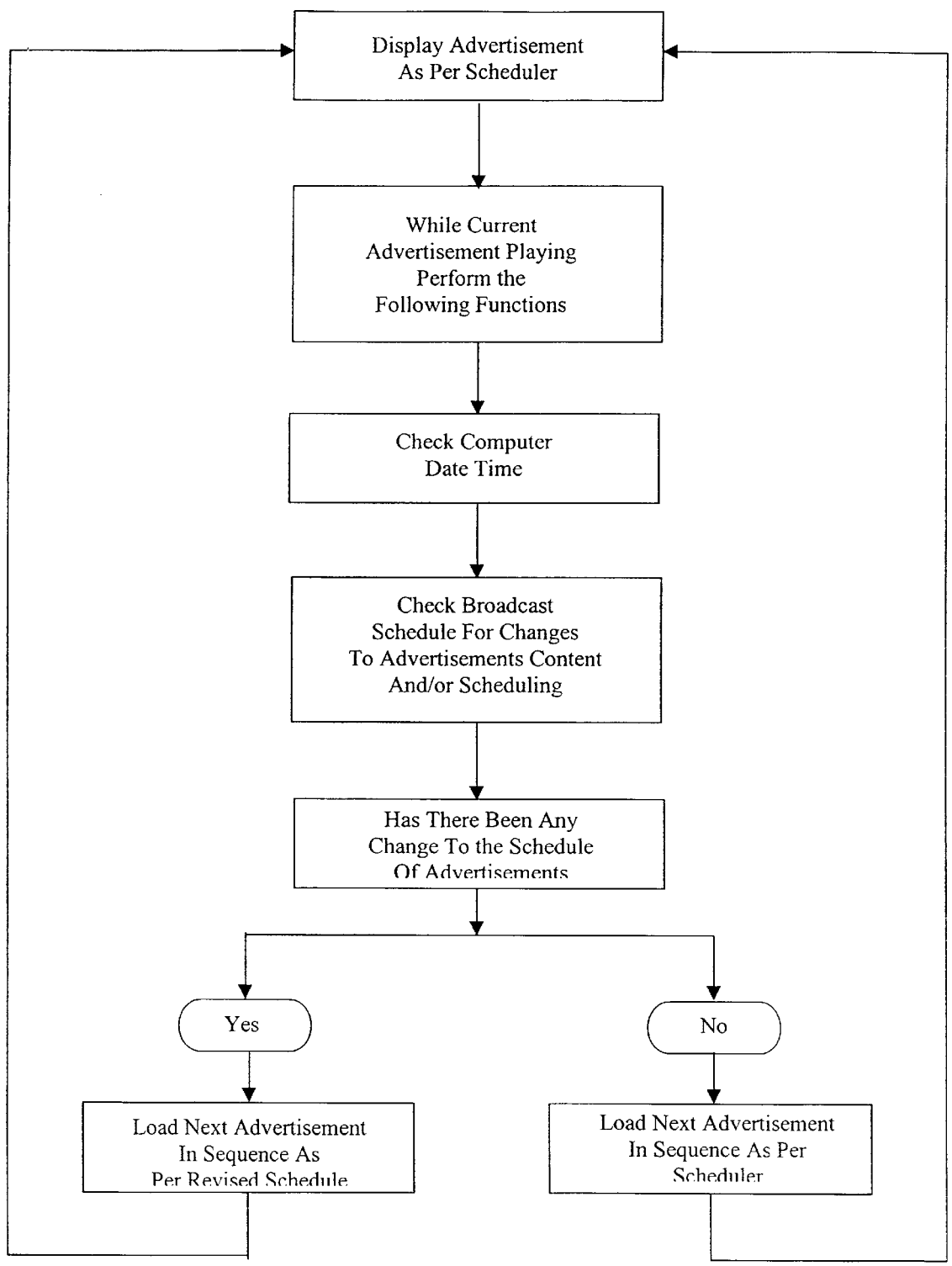
FIG. 7 is a flow diagram showing a display of specific information for the display.

Referring to FIG. 5, information to be displayed on the screen is transmitted to the display apparatus as described earlier along with a broadcast schedule. The broadcast schedule determines when the next information or advertisement information is to be displayed and in what sequence the information is to be displayed. As may be seen in FIG. 5, the processor within the display apparatus checks the broadcast schedule and based thereon, directs the appropriate information from the mass storage device to the display screen which then displays the information in the appropriate area of the screen. While the appropriate information is being displayed on the screen, the processor performs a constant check of the date and time and then performs a check for any changes in the broadcast schedule. Changes in the broadcast schedule may include changes in content of information to be displayed and times at which the information is to be displayed. If there has been a change in any if the information content or the scheduled times of display of the information, the appropriate information is loaded as per the revised schedule and displayed on the screen with reference to the sequence in FIG. 5.

Figure 8:
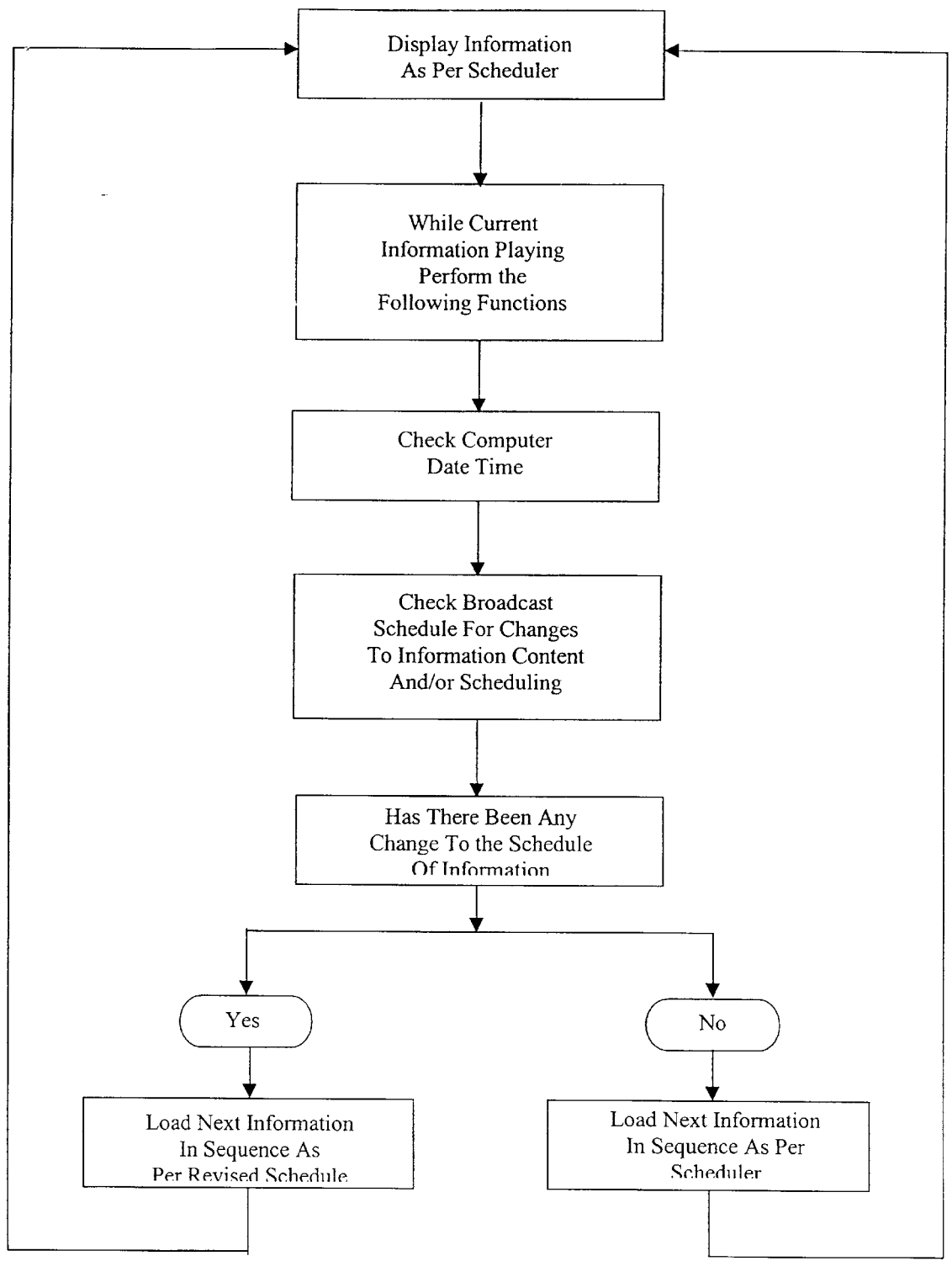
FIG. 8 is a flow diagram showing the display of a second type of information to the display.

A similar check for changes in the content and time sequence display of the advertising information is performed as indicated in FIG. 8. Thus, it may be seen that concurrent to the display of current advertising and current information, the display apparatus checks for updates to the advertising or the information content and schedule and loads the next appropriate advertising or information screen for display. When the currently displayed advertisement or general information screen has completed displaying the next scheduled advertisement or information is thus displayed. This sequence of events thus provides for seamless change of information and advertising.

Further, there can be an unlimited number of information screens scheduled for display which may be further displayed in any combination and for any predetermined length of time. The information displayed may include static images displayed for a predetermined period of time, digital videos, animation or any combination of information. Furthermore, there is also provided in an alternative embodiment the facility for including sound with the images.

In the above embodiment, the information to be displayed on the screens is uploaded from the building server computer to the individual display units in the elevator cab, where the information is processed according to the schedule included with the information. In another embodiment, the information may be fed in real time from the building server to the display unit and where the display apparatus does not store any significant amount of information thereon. Furthermore, the display apparatus may also provide for the return of diagnostic or maintenance information back to the server in order that the display unit may be monitored remotely without the need for maintenance personnel intervention, thus further reducing the overall cost of the system.

Thus it may be seen that the information display system of the subject invention may be implemented in various forms. Although the embodiments are shown with reference to specific examples, other modifications may be possible. These and other modifications to the variations upon the preferred embodiments are provided for by the present invention, the scope of which is limited only by the following claims.

We claim:

1. A device for displaying information in at least one elevator cab in each of a plurality of buildings, the device comprising:
   (a) a display including a display screen located in each elevator cab said display being adapted to receive and display information on said screen;
   (b) a plurality of building servers one building server located in each of the plurality of buildings in which an elevator cab is located, each building server being adapted to continuously communicate said information to each display in each elevator cab within that building; and
   (c) a central server remotely located from the plurality of building servers, wherein the information to be displayed is transmitted from the central server at predetermined times to each of the building servers and then to the display so as to provide said information simultaneously to each said display means located in said elevator cabs within each building, whereby said continuous display information is uninterrupted by elevator operation.

2. A device as defined in claim 1, said display means each having a unique address.

3. A device as defined in claim 2, said display screen being divided into areas for displaying advertising and general information thereon respectively.

4. A device as defined in claim 3, said display means including means for independently updating each of said display areas.

5. A device as defined in claim 1, said information including scheduling information.

6. A device as defined in claim 1, said display means being electrically connected to said building server for communication of information therebetween.

7. A device as defined in claim 1, said display means and said building server being adapted for wireless communication therebetween.

8. A device as defined in claim 1, said building server and said central server being adapted for wireless communication therebetween.

9. A device as defined in claim 1, said display means including a processor and a mass storage device.

10. A device as claimed in claim 9, said mass storage device being a hard disk.

11. A method of displaying information in one or more elevator cabs located in each of a plurality of buildings, said method comprising the steps of:
   compiling information including scheduling information to be displayed on a central computer remote from said plurality of buildings;
   transmitting said information to a plurality of building server computers, one building server computer located in each of the plurality of buildings;
   transmitting said information from each of said building server computers to a display located in each of said elevator cabs;
   receiving said information at said display;
   displaying said information on a display screen located at said display according to said scheduling information.

12. A method as defined in claim 11, said display means being electrically connected to said building server for communication of information therebetween.

13. A method as defined in claim 11, said display means and said building server being adapted for wireless communication therebetween.

14. A device as defined in claim 11, said display means each having a unique address.

15. In an information display system for a plurality of buildings or the like, an apparatus for displaying information in at least one elevator cab in each of the plurality of buildings, said apparatus comprising:

(a) a display means including a screen, said display means being adapted to be installed in each elevator cab;

(b) a memory means;

(c) a processing means, said memory means and processing means being associated with said display means;

(d) a communication means, associated with said display means adapted to receive information according to a predetermined protocol, and having a predetermined address;

(e) a plurality of building servers, one building server located in each building in which an elevator cab is located, each building server, being electrically connected to each display means within that building; and (f) a central server remotely located from the plurality of building servers, wherein said information to be display on said screens is compiled at said central server and transmitted from said central server to each of said building servers and then to said display means so as to provide said information simultaneously to each said display means located in said elevator cabs, and whereby information received via said communication means is stored in said memory and processed by said processing means to be displayed on said screen according to a predetermined schedule.

16. A system as defined in claim 15, wherein said information includes scheduling information.

17. A system as defined in claim 16, wherein said scheduling information is updated independently of said display information.

* * * * *